(12) United States Patent
Folmar et al.

(10) Patent No.: US 8,591,287 B2
(45) Date of Patent: Nov. 26, 2013

(54) METHODS OF FABRICATING A HONEYCOMB EXTRUSION DIE FROM A DIE BODY

(75) Inventors: David William Folmar, Campbell, NY (US); Aniello Mario Palumbo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 389 days.

(21) Appl. No.: 13/032,678

(22) Filed: Feb. 23, 2011

(65) Prior Publication Data

US 2012/0045973 A1 Feb. 23, 2012

Related U.S. Application Data

(60) Provisional application No. 61/308,695, filed on Feb. 26, 2010.

(51) Int. Cl.
*B24B 1/00* (2006.01)

(52) U.S. Cl.
USPC .......... 451/28; 451/57; 451/58; 451/69; 451/48; 125/30.02

(58) Field of Classification Search
USPC .......... 451/48, 57, 58, 69; 29/558, 557, 29/407.04; 125/30.02, 23.01, 13.01; 76/107.1; 83/51, 875, 876
See application file for complete search history.

(56) References Cited

U.S. PATENT DOCUMENTS

| | | | | |
|---|---|---|---|---|
| 4,403,131 A * | 9/1983 | Cunningham et al. | ...... | 219/69.12 |
| 5,008,509 A * | 4/1991 | Hattori et al. | ............ | 219/69.15 |
| 5,313,742 A * | 5/1994 | Corcoran et al. | ............ | 451/541 |
| 5,489,756 A * | 2/1996 | Seely | ............ | 219/69.12 |
| 5,630,951 A * | 5/1997 | Peters | ............ | 219/69.12 |
| 6,257,224 B1 * | 7/2001 | Yoshino et al. | ............ | 125/13.01 |
| 6,299,813 B1 * | 10/2001 | Brew et al. | ............ | 264/177.12 |
| 6,448,530 B1 * | 9/2002 | Fujita et al. | ............ | 219/69.17 |
| 6,578,458 B1 * | 6/2003 | Akram et al. | ............ | 83/13 |
| 8,425,279 B2 * | 4/2013 | Gurley et al. | ............ | 451/69 |
| 2002/0178883 A1 * | 12/2002 | Yamamoto | ............ | 83/22 |
| 2008/0168866 A1 | 7/2008 | Baba | ............ | 76/107.1 |

* cited by examiner

*Primary Examiner* — George Nguyen
(74) *Attorney, Agent, or Firm* — Matthew B. McNutt (57) ABSTRACT

Methods for fabricating a honeycomb extrusion die from a die body include the step of machining extrusion slots with at least one grinding wheel to provide a honeycomb pattern of extrusion slots. In further examples, a plurality of the extrusion slots of the honeycomb pattern of extrusion slots can be machined with a wire electrical discharge machining process after machining the plurality of extrusion slots of the honeycomb pattern of extrusion slots with the grinding wheel.

21 Claims, 6 Drawing Sheets

METHODS OF FABRICATING A HONEYCOMB EXTRUSION DIE FROM A DIE BODY

CROSS-REFERENCE To RELATED APPLICATIONS

This application claims the benefit of priority to U.S. provisional application No. 61/308,695, filed on Feb. 26, 2010.

FIELD

The present disclosure relates generally to methods of fabricating a honeycomb extrusion die, and more particularly, to honeycomb extrusion die bodies and methods of making honeycomb extrusion die bodies including discharge slots.

BACKGROUND

Conventional methods of fabricating a honeycomb extrusion die from a die body include electrical discharge machining Such conventional methods are known to provide an extrusion die configured to produce a honeycomb body having variable slot dimensions.

SUMMARY

In one aspect, a method is provided for fabricating a honeycomb extrusion die from a die body with a grinding wheel including a plurality of blades spaced from one another and concentrically aligned along a rotation axis of the grinding wheel. The method comprises the steps of rotating the grinding wheel about the rotation axis and moving the grinding wheel along a first directional axis while contacting the die body such that a plurality of a first set of parallel extrusion slots are simultaneously machined into the die body by the blades of the grinding wheel. The method further includes the steps of rotating the grinding wheel about the rotation axis and moving the grinding wheel along a second directional axis intersecting the first directional axis while contacting the die body such that a plurality of a second set of parallel extrusion slots are simultaneously machined into the die body by the blades of the grinding wheel. The die body is thereby provided with a honeycomb pattern of extrusion slots formed from intersecting extrusion slots from the first and second set of parallel extrusion slots.

In another aspect, a method is provided for fabricating a honeycomb extrusion die from a die body with a grinding wheel including at least one blade concentrically aligned along a rotation axis of the grinding wheel. The method comprises the steps of machining a first set of parallel extrusion slots into the die body along a first directional axis, wherein at least one slot of the first set of parallel extrusion slots is machined by rotating the grinding wheel about the rotation axis and moving the grinding wheel along the first directional axis. The method further includes the steps of machining a second set of parallel extrusion slots into the die—body along a second directional axis intersecting the first directional axis, wherein at least one slot of the second set of parallel extrusion slots is machined by rotating the grinding wheel about the rotation axis and moving the grinding wheel along the second directional axis, wherein the die body is provided with a honeycomb pattern of extrusion slots formed from intersecting extrusion slots from the first and second set of parallel extrusion slots. The method further includes the steps of machining a plurality of the extrusion slots of the honeycomb pattern of extrusion slots with a wire electrical discharge machining process after machining the plurality of extrusion slots of the honeycomb pattern of extrusion slots with the grinding wheel.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

Figure 1:
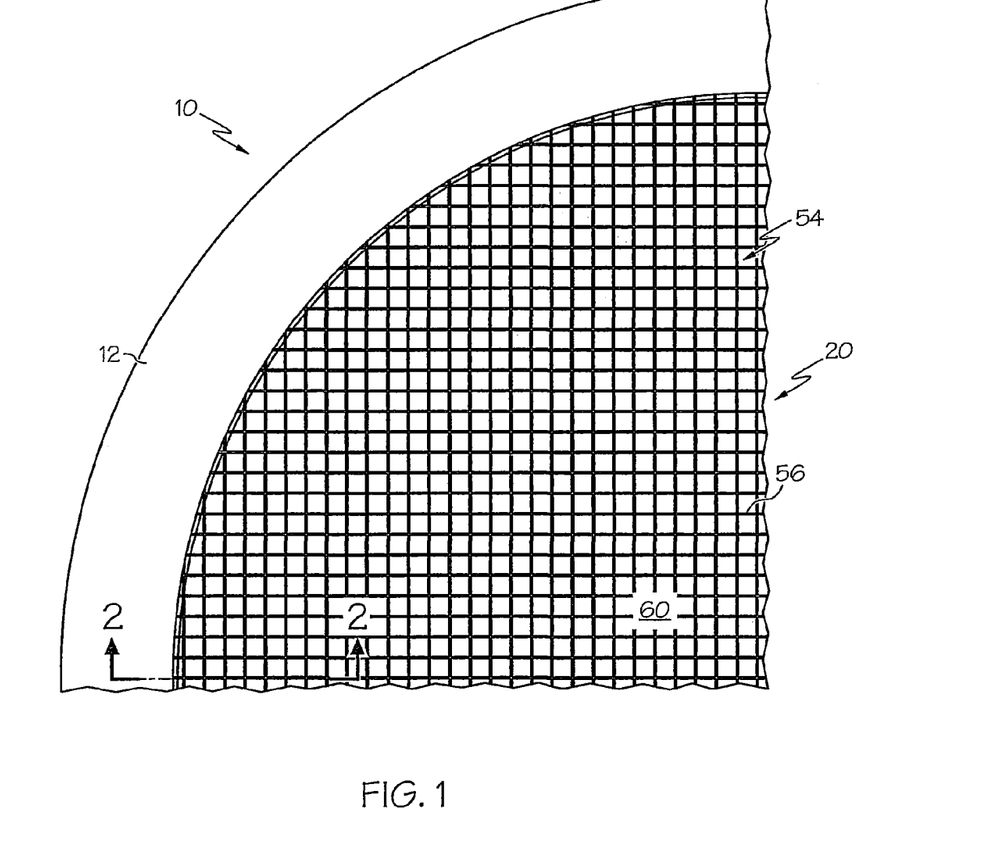
FIG. 1 is a partial plan view of an example honeycomb extrusion die apparatus.
Figure 2:
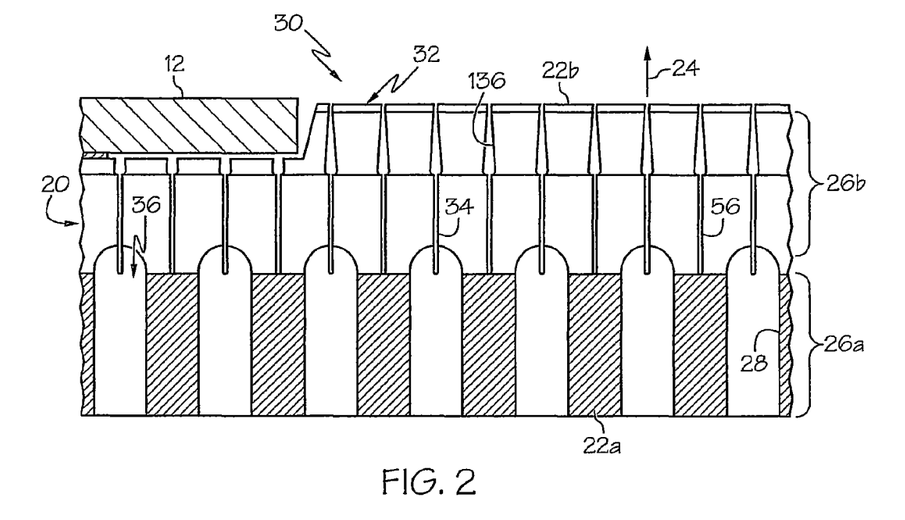
FIG. 2 is a partial sectional view of the honeycomb extrusion die apparatus along line 2-2 of FIG. 1.

An example honeycomb extrusion die 10 can comprise a die body 20 configured to be installed as part of an extrusion device (not shown). As shown in FIGS. 1 and 2, the honeycomb extrusion die can also comprise a mask member 12, and/or other components in addition to the die body 20. The honeycomb extrusion die 10 is configured to facilitate extrusion of plasticized ceramic-forming batch material to form a honeycomb body. For instance, honeycomb bodies can be used as a particulate filter for processing exhaust from a combustion engine. In some examples, the honeycomb bodies may be loaded with a catalyst to reduce nitrogen oxide compounds or other environmental pollutants.

Referring now to FIG. 1, a schematic illustration of a second quadrant of an example honeycomb extrusion die 10 is shown. Although not shown, the first quadrant can be a mirror image of the second quadrant about a vertical axis. Moreover, the third and fourth quadrants can be a mirror image of the first and second quadrants, respectively, about a horizontal axis. Thus, FIG. 1 can represent an example honeycomb extrusion die that has a circular discharge surface 60 configured to extrude cylindrical honeycomb bodies having a circular cylindrical form. The surface 60 of the honeycomb extrusion die 10 can have different shapes in other embodiments. For instance, the discharge surface can have a polygonal shape with three or more sides (e.g., triangular, rectangular, square, etc.) or other geometric shapes, such as elliptical or the like. The shape of the discharge surface can be selected depending on the desired shape of the honeycomb bodies extruded with the die body.

Referring now to FIG. 2, the die body 20 may include an inlet end 22a and a discharge end 22b opposite the inlet end 22a in an extrusion direction 24. The die body 20 may include an inlet region 26a, beginning at the inlet end 22a, that defines a plurality of feedholes 28 extending from the inlet end 22a. The plurality of feedholes 28 are configured to receive batch material from an extrusion device (not shown) such as a ram extruder or screw extruder. The die body 20 further includes a discharge region 26b terminating at the discharge end 22b. The discharge region 26b includes a plurality of die pins 30. Each die pin 30 includes an end face 32 positioned along the surface 60 (see FIG. 1) of the die body 20.

Each die pin 30 also includes side walls 34 defining a honeycomb pattern 54 (see FIG. 1) of extrusion slots 56 extending into the die body 20 from the surface 60. The extrusion slots 56 can connect with the feedholes 28 at feed hole and discharge slot intersections 36 at an interface within the die body 20 between the inlet region 26a and the discharge region 26b.

Figure 3:
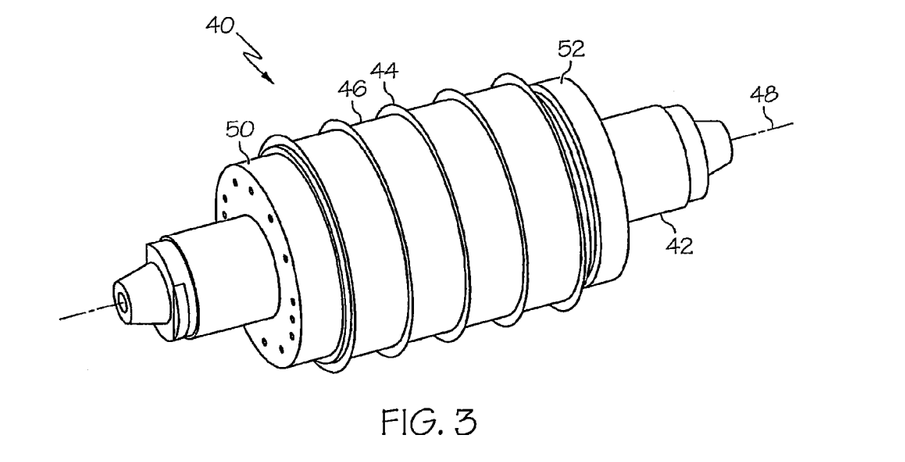
FIG. 3 is a perspective view of an example grinding wheel.

FIG. 3 illustrates a perspective view of an example grinding wheel 40 that may be used to machine a plurality of parallel extrusion slots 56 into the die body 20. The grinding wheel 40 may be provided with various alternative structures and configurations in accordance with aspects of the claimed invention. As shown in the illustrative example, the grinding wheel 40 can include at least one blade 44 configured to machine the extrusion slots into the die body 20. The illustrated example is shown to include a plurality of blades 44 (e.g., five blades) although more or less than five blades may be provided in further examples. Reducing the number of blades may be desirable to reduce the power requirements for the motor (not shown) that drives the grinding wheel 40 to spin around a rotation axis 48 of the grinding wheel 40. Increasing the number of blades may allow simultaneous machining of a larger subset of extrusion slots, thereby reducing the overall processing time necessary to produce the final honeycomb pattern of extrusion slots. In the illustrated example, five blades 44 may be provided to help balance the benefits of reduced power requirements for the motor while providing a sufficient number of blades to significantly reduce the processing time.

It will be appreciated that the blades 44 may comprise a wide range of materials and sizes, depending on factors including the die body material, width and/or depth of the slots, etc. For instance, the blade material may be a cubic form of boron nitride (CBN). In other examples, the blade may be a diamond blade, steel, etc. Additionally, the thickness of the blades 44 may vary depending on the target size of the extrusion slots 56. The blade thickness may range from 0.002"-0.030". For instance, the thickness of each blade 44 may be selected to be slightly less than the target width of each extrusion slot 56. In one example, if the target slot width is 0.0072", a corresponding blade thickness for forming the slot may be 0.0045".

The grinding wheel 40 can further include an axial member, such as the illustrated arbor 42, to allow the one or more blades 44 to be concentrically aligned along a rotation axis 48 of the grinding wheel 40. The arbor, if provided, can include various features to cooperate with the one or more blades 44. For example, as shown, the arbor 42 can comprise circular cylindrical shaft with the illustrated tapered ends. In alternative examples, the arbor may comprise a cylinder with a polygonal cross section (e.g., triangular, rectangular, etc.) or other shapes. Providing a polygonal cross section may be desirable to help nonrotatably position the one or more blades 44 relative to the arbor 42. The arbor may further include mounting features to help position the one or more blades 44 relative to the arbor 42. For example, as shown, one end of the arbor 42 may have a raised rim 50 while an opposed end of the arbor 42 may be threaded (not shown). The threaded end of the arbor 42 can be configured to receive the illustrated compression nut 52.

As shown, the plurality of blades 44 may be spaced evenly along the rotation axis 48 to allow a plurality of parallel evenly spaced slots to be machined into the die body 20. In one example, one or more spacers 46 may be provided between corresponding pairs of blades 44. The width of each spacer 46 depends on a target distance between each adjacent extrusion slot, also referred to as the pitch. For instance, for a die body with a larger distance between each adjacent slot, each spacer 46 may have a corresponding width, such that each adjacent blade 44 is spaced wide enough to form the desired die pin size. In further examples, the blades may be spaced at a multiple of the spacing between adjacent extrusion slots 56 of the final honeycomb pattern 54 of extrusion slots. For example, a first pass may machine every other extrusion slot while a second pass may machine extrusion slots between the previously machined extrusion slots.

As shown in FIG. 3, the spacers 46 are substantially circular in shape, however other shapes and sizes are contemplated. For instance, the spacers 46 may be polygonal in shape, such as rectangular, square, etc. or other geometric shapes, such as elliptical, etc. Moreover, the spacers 46 may have varying sizes. In the shown example, the spacers 46 have a slightly smaller diameter than the blades 44. The spacers 46 may have a sufficiently small diameter, such that the blades 44 can form the desired slot depth without the spacers 46 contacting the die body 20. The spacers 46 may be made of a number of materials, such as ceramic, metal, etc. In addition, the spacers 46 may be removable, allowing a user to insert a differently sized spacer 46 and adjust the distance between the slots.

An example of assembling the grinding wheel 40 can include the steps of inserting the end of the arbor 42 through a central bore of a first blade 44 and then sliding the first blade 44 down along the arbor to abut the raised rim 50. In examples with a plurality of blades, the end of the arbor 42 may then inserted through a central bore of a first spacer 46 and then through the central bore of a second blade 44. This process can be continued, with alternating blades and spacers, until the grinding wheel is configured with the desired number of blades. The central bores of the blades and spacers may have a noncylindrical configuration to match a corresponding cylindrical configuration of the arbor 42. As such, the blades and spacers may be keyed onto the arbor 42 to help prevent relative rotation between the blades. A compression nut 52 may then be threaded onto the arbor and tightened to compress the blades and spacers together in a mounted position on the arbor. Once mounted, the blades 44 and spacers 46 are concentrically aligned along the rotation axis 48 and are configured to be rotated together with the arbor 42 about the rotation axis 48.

A grinding machine (not shown) may be provided to receive the grinding wheel 40. The grinding machine, such as a vertical or horizontal grinding machine, may be configured to receive the arbor 42 and rotate the grinding wheel 40 about the rotational axis 48 during the machining process. In one example, the arbor 42 is placed on a 4-axis milling machine and may be spun up to 20,000 rpm although the arbor 42 may be rotated at different speeds in further examples. As will be described below, the blades 44 may be rotated at a sufficient speed to provide effective machining of the extrusion slots. Optionally, cutting fluid, coolant, or the like may be distributed to the blades for cooling and/or removing debris during the machining process. If spacing between the blades 44 is to be altered for any reason, the compression nut 52 may be removed from the arbor. Spacers having a different width may then replace the spacers 46. Similarly, blades 44 may be removed and replaced with different blades. For example, blades 44 may be replaced with blades having different widths and/or diameters. Also, worn or damaged blades 44 may be individually replaced, thereby reducing costs by replacing only damaged or worn blades without disposal of the entire grinding wheel.

Figure 4:
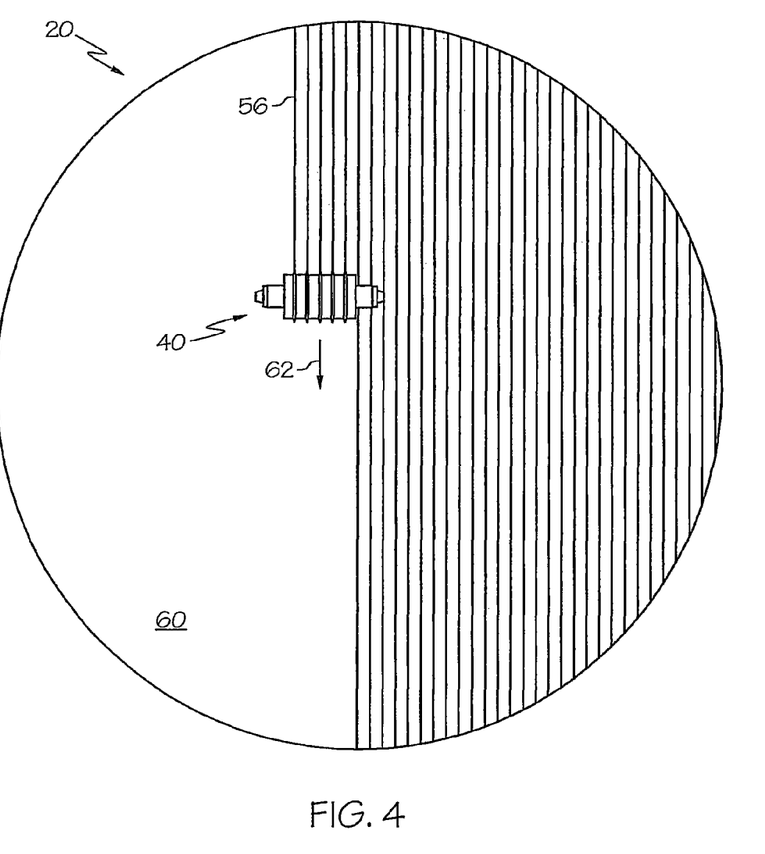
FIG. 4 is an example of a grinding wheel simultaneously machining a plurality of a first set of parallel extrusion slots into a die body.

Referring now to FIG. 4, an illustration of the extrusion slots 56 being machined into the die body 20 is shown. The grinding wheel 40 may be spun about the rotation axis 48 while contacting the surface 60. In one example, the grinding wheel 40 may start from an edge of the die body 20 and move along a first directional axis 62 while remaining in contact with the surface. Although not shown, the edges of the die body 20 may be chamfered to facilitate entry of the blades 44 through the edge of the die body 20. In another example, however, the grinding wheel 40 may begin from within a central portion the surface 60 away from an edge of the die body 20. As the grinding wheel moves along the first directional axis 62, one or more extrusion slots 56 are machined into the die body 20 by the blades 44. For instance, in the shown example, the grinding wheel 40 has five blades 44. As such, the blades 44 simultaneously machines up to five parallel extrusion slots 56 into the surface 60 of the die body 20. The number of blades 44 may be varied, however, including providing as few as a single blade on the arbor 42 or more. With a single blade, the grinding wheel 40 may machine a single slot into the surface 60 of the die body.

The first set of parallel extrusion slots may include extrusion slots 56 formed on the surface 60 of the die body 20 by moving the grinding wheel 40 along one or more paths along the first directional axis 62. The paths taken by the grinding wheel 40 may be changed, however. In one example, the first set of parallel extrusion slots may be formed by running the grinding wheel 40 along the first directional axis 62 one or more times. The grinding wheel 40 may have a sufficient number of blades such that a single path along the first directional axis 62 forms the extrusion slots 56 that comprise the first set of parallel extrusion slots.

The first set of parallel extrusion slots 56 may also be machined by successively passing the grinding wheel 40 along the first directional axis 62 a plurality of times along a plurality of paths. For instance, in one example, the grinding wheel 40 may make a path along the first directional axis 62 and form the extrusion slots 56. The grinding wheel 40 may then retrace the path. Each path may provide the extrusion slot with an incremental increased depth, thereby providing the overall desired depth of the extrusion slot from a series of overlapped machining paths. The path may be completely retraced, or, in the alternative, may be partially retraced. Partial retracing or spaced apart paths may be provided to incrementally increase the width to provide the overall desired width of the extrusion slot from a series of machining paths.

In addition or alternatively, the first set of parallel extrusion slots may be produced by machining a first subset of extrusion slots and then subsequently machining a second subset of extrusion slots while not machining a plurality of the first subset of extrusion slots. In this example, the grinding wheel 40 may make a pass along a first path to machine the first subset of extrusion slots. The grinding wheel 40 may subsequently make a second pass along a second path spaced from the first path to machine the second subset of extrusion slots. Therefore, the first set of extrusion slots may include a combination of subsets of extrusion slots successively machined into the die body. Successive machining of each subsequent subset may occur adjacent to the previously machined subset although subsets may be randomly or selectively machined at alternative locations of the die body. As shown, the second subset of extrusion slots is machined while not machining any of the first subset of extrusion slots. In this example, the first set of parallel extrusion slots may be achieved with a reduced number of paths. Alternatively, when machining the second subset of extrusion slots, at least one of the blades may pass through extrusion slots of the first subset to further machine the slot or simply pass through the slot without machining Referring now to FIG. 5, an illustration of the extrusion slots 56 being machined into the die body 20 along a second directional axis 64 is shown. In the shown example, the second directional axis 64 intersects the first directional axis 62 substantially perpendicularly to form a honeycomb pattern 54 of extrusion slots 56. In other examples, however, the second directional axis 64 may be positioned at a different angle with respect to the first directional axis 62, such as by forming an angle of more or less than a 90° with respect to the first directional axis 62. As such, die pins having various polygonal configurations may be provided to define a honeycomb network of various cell configurations.

Figure 5:
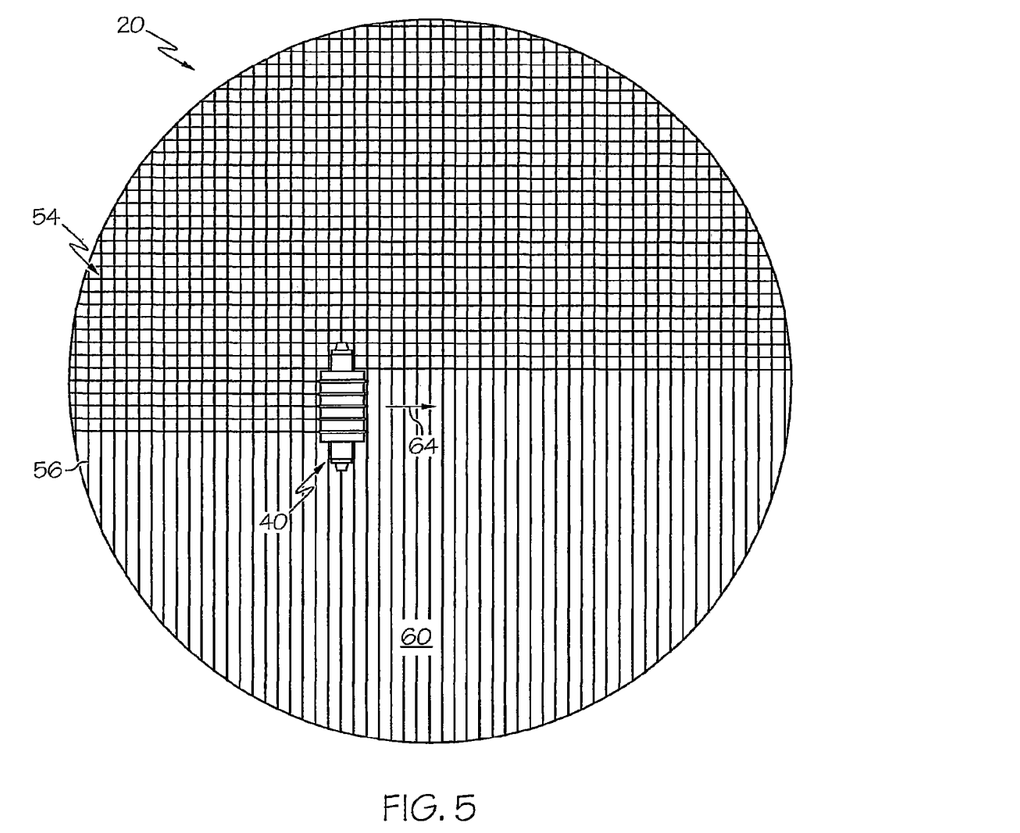
FIG. 5 is an example of the grinding wheel simultaneously machining a plurality of a second set of parallel extrusion slots into the die body of FIG. 4.

The method of forming the slots along the second directional axis 64 may be similar or identical to the method of forming the slots along the first directional axis 62 described above. The grinding wheel 40 may be oriented along the second directional axis 64. During the machining process, the grinding wheel 40 may be held in contact with the surface 60 of the die body 20. The grinding wheel 40 and blades 44 may be spun about the rotation axis 48 in the direction of the second directional axis 64 while in contact with the surface 60 to form the extrusion slots 56. As the grinding wheel 40 moves, one or more extrusion slots 56 are machined into the die body 20 by the blades 44 along the second directional axis 64. As described above, the grinding wheel 40 in the shown example has five blades 44 while a single or alternative numbers of blades may be provided in further examples.

As set forth with respect to the first set of parallel slots, the grinding wheel 40 may likewise take a number of different paths to form a second set of parallel extrusion slots 56. In one example, the grinding wheel 40 may be spun about the rotation axis 48 while contacting the surface 60. The grinding wheel 40 may start from an edge of the die body 20 and move along the second directional axis 64 while remaining in contact with the surface. In another example, however, the grinding wheel 40 may begin from within a central portion the surface 60 away from an edge of the die body 20. As the grinding wheel moves along the second directional axis 64, one or more extrusion slots 56 are machined into the die body 20 by the one or more blades 44.

The second set of parallel extrusion slots may include extrusion slots 56 formed on the surface 60 of the die body 20 by moving the grinding wheel 40 along one or more paths along the second directional axis 64. The paths taken by the grinding wheel 40 may be changed, however. In one example, the second set of parallel extrusion slots may be formed by running the grinding wheel 40 along the second directional axis 64 one or more times. The grinding wheel 40 may have a sufficient number of blades such that a single path along the second directional axis 64 forms the extrusion slots 56 that comprise the second set of parallel extrusion slots.

The second set of parallel extrusion slots 56 may also be machined by successively passing the grinding wheel 40 along the second directional axis 64 a plurality of times along a plurality of paths. For instance, in one example, the grinding wheel 40 may make a path along the second directional axis 64 and form the extrusion slots 56. The grinding wheel 40 may then retrace the path. Each path may provide the extrusion slot with an incremental increased depth, thereby providing the overall desired depth of the extrusion slot from a series of overlapped machining paths. The path may be completely retraced, or, in the alternative, may be partially retraced. Partial retracing or spaced apart paths may be provided to incrementally increase the width to provide the overall desired width of the extrusion slot from a series of machining paths.

In addition or alternatively, the second set of parallel extrusion slots may be produced by machining a second subset of extrusion slots and then subsequently machining a second subset of extrusion slots while not machining a plurality of the first subset of extrusion slots. In this example, the grinding wheel 40 may make a pass along a first path to machine the first subset of extrusion slots. The grinding wheel 40 may subsequently make a second pass along a second path spaced from the first path to machine the second subset of extrusion slots. Therefore, the second set of extrusion slots may include a combination of subsets of extrusion slots successively machined into the die body. Successive machining of each subsequent subset may occur adjacent to the previously machined subset although subsets may be randomly or selectively machined at alternative locations of the die body. As shown, the second subset of extrusion slots is machined while not machining any of the first subset of extrusion slots. Alternatively, when machining the second subset of extrusion slots, at least one of the blades may pass through extrusion slots of the first subset to further machine the slot or simply pass through the slot without machining.

The blades 44 mounted on the arbor 42 may be identical in size and shape. Therefore, the slots formed in the surface 60 of the die body 20 may be nearly identical by having a substantially constant width and depth. In one example, blades having a 0.0045" width may be used to machine slots having approximately a 0.0048" slot width. In such an example, the slots formed in the surface 60 may have a substantially constant slot width of about 0.0048". Since the blades may be identical in shape, they will also form a substantially constant slot depth in the surface 60. It is understood, however, that varying blade sizes and shapes may be used to produce slots having a varying width and depth.

Referring now to FIGS. 6, 6A, 6B, and 6C, a method for machining the slots with a wire electrical discharge machining process will now be described. After the grinding wheel 40 has machined the extrusion slots 56 into the die body 20, a honeycomb pattern 54 of slots is present. The extrusion slots 56 formed in the surface 60 may be nearly identical by having a substantially constant width and depth. The wire electrical discharge machining (EDM) process may be used to reduce variability from slot to slot by removing small amounts of material from the slots to help achieve a target slot width and/or depth. In one example, to generate a target slot width of 0.0073", a blade thickness of 0.0045" may be used. After the blade machining step, the 0.0045" blade will generate approximately a 0.0048" slot width. To achieve the final target slot width of 0.0073", a 0.006" wire may be used in the wire EDM process to remove approximately 0.00125" from each side of a slot. The wire EDM process may then be repeated on some or all of the slots to attain the target slot width with minimal variability from slot to slot, as will be described below.

Figure 6:
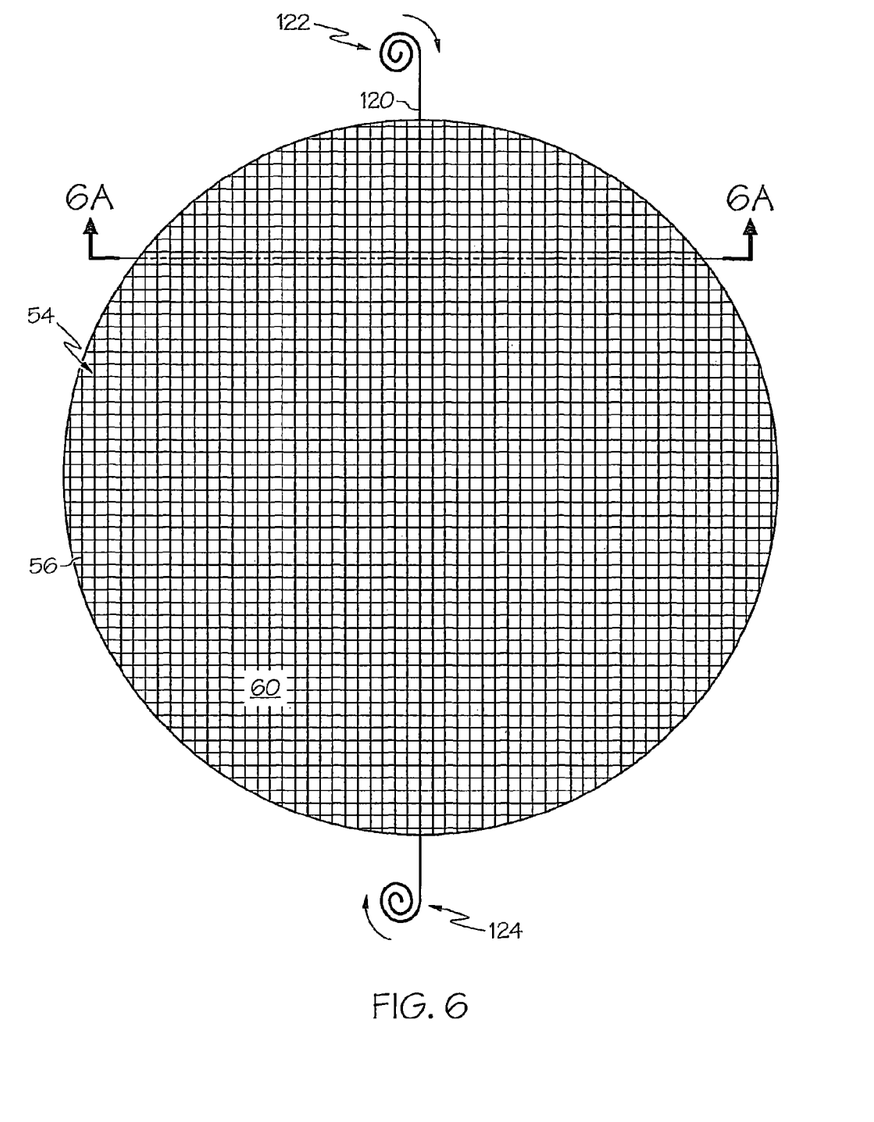
FIG. 6 is an example of a wire electrical discharge machining process being conducted on an extrusion slot previously machined by the grinding wheel.

Referring to FIG. 6, the wire EDM process may be used to remove a substantially even amount of material from both sides of a slot. As shown schematically, the wire EDM process can employ a strand of wire 120 that is continuously fed from a feed reel 122 to a receiving reel 124 on an opposing side such that a machining portion of the wire 120 extends between the reels 122, 124. The feed reel 122 and receiving reel 124 may be positioned on each side of the die body 20 in alignment with an extrusion slot 56, such that the wire 120 extends within the slot between the reels 122, 124. The wire 120 may then be continuously fed while running through the slot in close proximity to one or both sides of the slot.

Figure 6A:
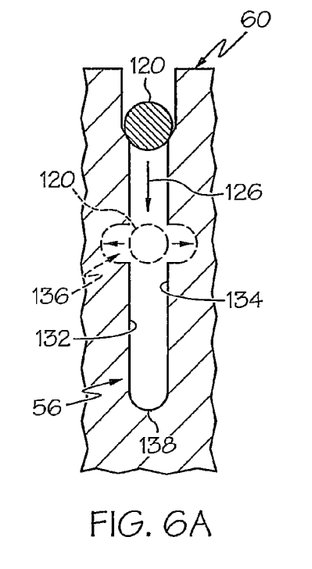
FIG. 6A is a partial sectional view of an example die body slot along the line 6A-6A of FIG. 6, illustrating one example wire electrical discharge machining process.
Figures 6B, 6C:
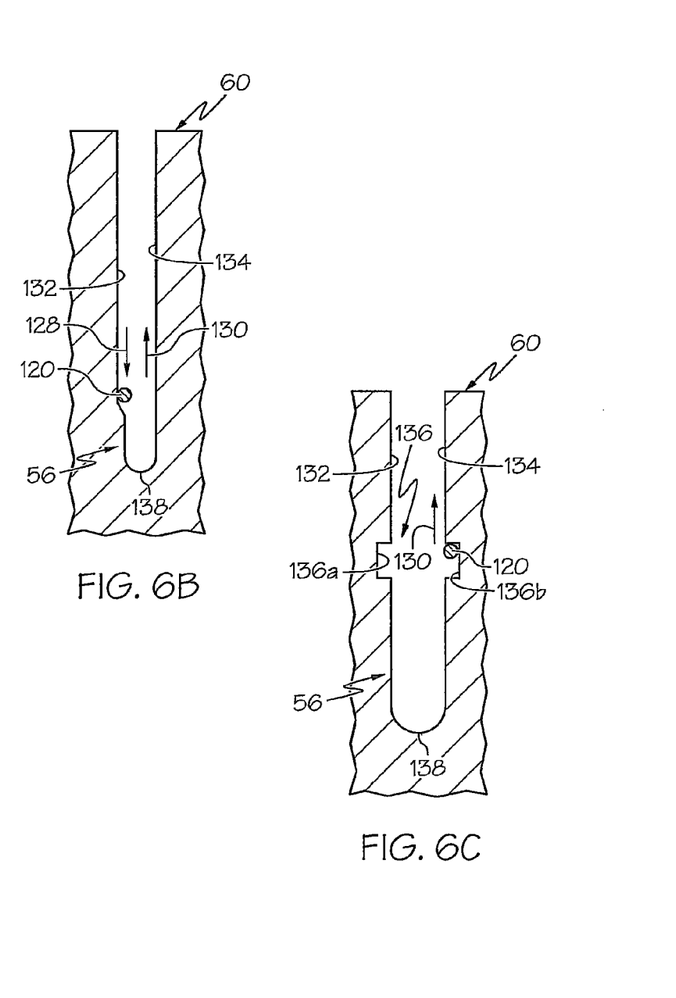
FIG. 6B is another partial sectional view of an example die body slot along the line 6A-6A of FIG. 6, illustrating another example wire electrical discharge machining process.
FIG. 6C is still another partial sectional view of an example die body slot along the line 6A-6A of FIG. 6, illustrating yet another example wire electrical discharge machining process.

FIGS. 6A, 6B and 6C illustrate examples of a wire EDM process being conducted on an extrusion slot 56 previously machined by the grinding wheel 40. As shown, the wire EDM process may be conducted after machining of all of the extrusion slots 56 of the honeycomb pattern 54 of extrusion slots with the grinding wheel 40. In further examples, the wire EDM process may be performed, such as periodically, before all of the extrusion slots are formed with the grinding wheel 40. For instance, the wire EDM process may be conducted on the first subset extrusion slots while the grinding wheel machines the second subset of extrusion slots. The grinding wheel can then machine a third subset of extrusion slots while the wire EDM process is conducted on the second subset of extrusion slots. This process can be continued until the honeycomb pattern 54 of extrusion slots is complete. Conducting the EDM process periodically may reduce overall time to fabricate the honeycomb extrusion die.

Conducting a periodic EDM process may also be carried out after completion of the corresponding first set of parallel extrusion slots and the second set of parallel extrusion slots. For instance, as shown in FIG. 4, the first set of parallel extrusion slots can be machined by the grinding wheel 40. Then the first set of parallel extrusion slots may be machined with the wire EDM process. As shown in FIG. 5, the second set of parallel extrusion slots can then be machined by the grinding wheel 40. Then the wire EDM process may be carried out on the second set of parallel extrusion slots.

FIG. 6A, illustrates just one example of a wire EDM process being carried out referencing a partial sectional view of the die body 20 with an example extrusion slot and EDM wire 120. The width of the slot machined by the grinding wheel before the wire EDM process is shown below the wire 120. The width of the slot after the wire EDM process is shown above the wire 120. As shown, the average width of the extrusion slots 56 machined by the grinding wheel 40 may be less than the average diameter of the wire 120 used during the wire EDM process. In further examples, the width of the wire may be less than or equal to the average width of extrusion slots 56 machined by the grinding wheel 40. For instance, as shown in FIG. 6B, the average width of the extrusion slots machined by the grinding wheel may be greater than the average diameter of the wire 120 used during the wire EDM process.

In FIG. 6A, the wire EDM process may start at the surface 60 of the die body 20. While the wire 120 runs continuously between the feed reel 122 and the receiving reel 124, the wire 120 may be run along a depth path 126 from the surface 60 and into the extrusion slot 56. Electrical discharges between the wire 120 and die body 20 remove small amounts of material from both sides of the slot as the wire 120 comes into close contact with the sides of the extrusion slot 56. The wire 120 continues to be lowered into the extrusion slot 56 along the depth path 126, removing material from first and second sides 132, 134 of the extrusion slot 56 as it moves. The wire 120 will eventually reach a bottom 138 of the slot, having removed material from the sides of the entire extrusion slot 56 and achieving the target slot dimensions. The wire 120 may then be temporarily stopped from running between the feed reel 122 and receiving reel 124. At this point, the wire 120 may be removed from the machined extrusion slot 56, and the wire EDM process can start again at a separate, unmachined slot. In another example, when the wire 120 reaches the bottom 138 of the slot, the wire 120 may continue to run between the feed reel 122 and receiving reel 124. The wire 120 may be removed from the machined slot while the wire 120 continues to run, and will then start the wire EDM process again at a separate, unmachined slot. The wire EDM process may continue until some or all of the slots have been machined. In such an example, the wire continues to run during the entire wire EDM process, thus preventing any stopping and re-starting of the wire.

Referring to FIG. 6B, the average width of the extrusion slots 56 machined by the grinding wheel may be greater than the average diameter of the wire 120 used during the wire EDM process. In the shown example, the wire EDM process may start along the first side 132 of the extrusion slot 56 at the surface 60 of the die body 20. While the wire 120 runs continuously between the feed reel 122 and the receiving reel 124, the wire 120 may run along a first depth path 128. As the wire runs along the first depth path 128 towards the bottom 138 of the extrusion slot 56, material is removed from the first side 132 by the wire EDM process. The wire 120 will eventually reach the bottom 138 of the extrusion slot 56, having removed material from the first side 132 of the extrusion slot 56. The wire 120 may continue the wire EDM process by running across the bottom 138 of the extrusion slot 56 towards the second side 134 of the extrusion slot 56. Upon reaching the second side 134 of the slot, the wire 120 may run along a second depth path 130 from the bottom of the slot towards the surface 60. As the wire 120 runs along the second depth path 130 towards the surface 60, material is removed from the second side 134 by the wire EDM process. The wire 120 will eventually reach the surface 60, having removed material from the second side 134 of the slot. At this point, the wire 120 will have removed material from both sides 132, 134 of the slot and achieved the target slot dimensions. The wire 120 may then be moved to a separate, unmachined extrusion slot 56 for the wire EDM process to start again.

Referring to FIG. 6C, the wire EDM process may further machine a divot 136 in each extrusion slot 56. In the shown example, the average width of the extrusion slot machined by the grinding wheel 40 is shown to be greater than the average diameter of the wire 120 used during the wire EDM process. As the wire 120 runs along the first depth path 128 towards the bottom of the slot, the wire 120 may machine a divot 136a into the first side 132 of the slot by removing material from the first side 132 of the extrusion slot 56. The wire 120 may then continue the wire EDM process along the first side 132 of the extrusion slot 56 and along the bottom 138 of the extrusion slot 56. The wire 120 may continue machining along the second depth path 130. At substantially the opposite side of the divot 136a, the wire 120 may machine a corresponding divot 136b into the second side 134 of the slot by removing material from the second side 134 of the slot. After the divot is formed, the wire 120 may continue the wire EDM process along the second side 134 of the slot towards the surface 60. The wire EDM process may then be repeated including forming a divot in some or all of the remaining slots. The divot 136 (e.g., 136a, 136b) in FIG. 6C is shown to have substantially square edges, but in other examples, the divot 136 may have rounded edges and/or appear elongated as shown in FIG. 2.

As described above, the average width of the slots machined by the grinding wheel may be less than the average diameter of the wire 120 used during the wire EDM process. In such an example, the divot 136 may be formed in some or all of the slots. Referring to FIG. 6A, when the wire 120 reaches a pre-determined distance in the slot, the wire 120 may machine a divot 136 into the extrusion slot 56 by removing material from both sides 132, 134 of the extrusion slot 56. This may be accomplished by the wire 120 moving laterally within the extrusion slot 56. After the divot 136 is formed, the wire 120 may continue the wire EDM process by resuming movement along the depth path 126. Divots 136 may be formed in some or all of the remaining slots. In another example, the wire 120 may finish the wire EDM process on a slot before forming the divot 136. In this example, the wire 120 will travel along the depth path 126 from the surface 60 to the bottom of the slot before forming the divot 136 in the slot.

Following the grinding wheel 40 machining step and wire EDM process, a target slot dimension will be achieved. The machining of the slots with the grinding wheel 40 and wire EDM process reduces the slot dimension variability from slot to slot. In one example, the variability of a dimension of each extrusion slot after the wire EDM process may be no greater than +/−4% of the target slot dimension. In this example, the target slot width may be 0.006". The slots may vary, however, between a width of 0.0058" to 0.0062". Thus, the variability may be no greater than +/−0.0002", or +/−3.3%. In another example, the variability of a dimension of each extrusion slot may be further reduced to be no greater than +/−2% of the target slot dimension. In this example, with a target slot width of 0.006", the slots may vary between a width of 0.0059" to 0.0061". Thus, the variability may be no greater than +/−0.0001", or +/−1.6%.

The dimension of each extrusion slot 56 may include the width of each extrusion slot and/or the depth of each extrusion slot. For instance, if only the sides 132, 134 of each slot are treated with the wire EDM process, then the variability of the slot dimensions, only including the width, is reduced from slot to slot. Similarly, in another example, both the sides 132, 134 and the bottom 138 of each extrusion slot 56 may be treated with the wire EDM process. In this example, the variability of the slot dimensions, including both the depth and width, is reduced from slot to slot.

Fabricating a honeycomb extrusion die by machining the extrusion slots with a grinding wheel and then performing the wire EDM process can take less time than machining the extrusion slots with a wire EDM procedure alone. Moreover, finishing the machining process with the wire EDM process can reduce the variability of the extrusion slot dimensions (e.g., width, depth, etc.). Still further, machining the extrusion slots with the grinding wheel can achieve a substantially uniform depth throughout the length of the extrusion slot. This depth can then be fine tuned with the wire EDM process. On the other hand, attempting the form the extrusion slots alone without first machining the extrusion slots with the grinding wheel can significantly increase the stress on the EDM wire. As such, the center portion of the EDM wire may bow during the machining process, wherein the corresponding center portion of the extrusion slot may have depth that is less than the depth of the ends of the extrusion slot. This variability can be addressed by first machining the slots with a substantially constant depth using the grinding wheel. Then the wire EDM process can be used to fine tune the depth of the extrusion slots. Therefore, the wire EDM process reduces the variability of the slot dimensions that may otherwise be achieved by the grinding wheel alone.

Still further, example methods employing the wire EDM process may achieve beneficial surface characteristics that may not be achieved using the grinding wheel alone. These surface characteristics can facilitate the flow of batch material through the extrusion slots when using the honeycomb extrusion die 10 to extrude a green body of ceramic material.

In further examples, the order of the machining may be reversed. For example, the EDM wire process may be conducted prior to the process of grinding with the grinding wheel. Grinding the extrusion slots first formed by the EDM wire process may be desirable, for example, in certain applications where the surface finish left by the grinding wheel is desired.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of fabricating a honeycomb extrusion die comprising the steps of:
   providing a die body including an inlet end and a discharge end opposite the inlet end in an extrusion direction;
   providing the die body with a plurality of feed holes extending from the inlet end and configured to receive batch material;
   providing a grinding wheel including a plurality of blades spaced from one another and concentrically aligned along a rotation axis of the grinding wheel;
   rotating the grinding wheel about the rotation axis and moving the grinding wheel along a first directional axis while contacting the discharge end of the die body such that a plurality of a first set of parallel extrusion slots are simultaneously machined into the discharge end of the die body by the blades of the grinding wheel; and
   rotating the grinding wheel about the rotation axis and moving the grinding wheel along a second directional axis intersecting the first directional axis while contacting the discharge end of the die body such that a plurality of a second set of parallel extrusion slots are simultaneously machined into the discharge end of the die body by the blades of the grinding wheel, wherein the die body is provided with a honeycomb pattern of extrusion slots formed from intersecting extrusion slots from the first and second set of parallel extrusion slots, and wherein the honeycomb pattern of extrusion slots are connected with the feed holes such that the die body is configured to extrude a honeycomb body from batch material being fed through the feed holes and extruded through the honeycomb pattern of extrusion slots.

2. The method of claim 1, wherein the first set of parallel slots are machined into the die body by successively passing the grinding wheel along a plurality of paths along the first directional axis.

3. The method of claim 2, wherein at least a plurality of the paths are spaced from one another.

4. The method of claim 1, wherein the first set of parallel extrusion slots are produced by machining a first subset of extrusion slots and then subsequently machining a second subset of extrusion slots while not machining a plurality of the first subset of extrusion slots.

5. The method of claim 1, wherein the first set of parallel extrusion slots are produced by machining a first subset of extrusion slots and then subsequently machining a second subset of extrusion slots while not machining any of the extrusion slots of the first subset of extrusion slots.

6. The method of claim 1, wherein the second set of parallel slots are machined into the die body by successively passing the grinding wheel along a plurality of paths along the second directional axis.

7. The method of claim 6, wherein at least a plurality of the paths are spaced from one another.

8. The method of claim 1, wherein the second set of parallel extrusion slots are produced by machining a first subset of extrusion slots and then subsequently machining a second subset of extrusion slots while not machining a plurality of the first subset of extrusion slots.

9. The method of claim 1, wherein the second set of parallel extrusion slots are produced by machining a first subset of extrusion slots and then subsequently machining a second subset of extrusion slots while not machining any of the extrusion slots of the first subset of extrusion slots.

10. The method of claim 1, wherein after machining the honeycomb pattern of extrusion slots with the grinding wheel, a plurality of the extrusion slots of the pattern of extrusion slots are further machined with a wire electrical discharge machining process.

11. The method of claim 1, wherein after machining the first set of parallel extrusion slots with the grinding wheel, a plurality of the first set of extrusion slots are further machined with a wire electrical discharge machining process.

12. The method of claim 1, wherein after machining the second set of parallel extrusion slots with the grinding wheel, a plurality of the second set of extrusion slots are further machined with a wire electrical discharge machining process.

13. A method of fabricating a honeycomb extrusion die from a die body with a grinding wheel including at least one blade concentrically aligned along a rotation axis of the grinding wheel, the method comprising the steps of:
   machining a first set of parallel extrusion slots into the die body along a first directional axis, wherein at least one slot of the first set of parallel extrusion slots is machined by rotating the grinding wheel about the rotation axis and moving the grinding wheel along the first directional axis;
   machining a second set of parallel extrusion slots into the die body along a second directional axis intersecting the first directional axis, wherein at least one slot of the second set of parallel extrusion slots is machined by rotating the grinding wheel about the rotation axis and moving the grinding wheel along the second directional axis, wherein the die body is provided with a honeycomb pattern of extrusion slots formed from intersecting extrusion slots from the first and second set of parallel extrusion slots; and
   machining a plurality of the extrusion slots of the honeycomb pattern of extrusion slots with a wire electrical discharge machining process after machining the plurality of the extrusion slots of the honeycomb pattern of extrusion slots with the grinding wheel.

14. The method of claim 13, wherein a variability of a dimension of each extrusion slot after the wire electrical discharge machining process is +/−4% of a target slot dimension.

15. The method of claim 13, wherein a variability of a dimension of each extrusion slot after the wire electrical discharge machining process is +/−2% of the target slot width.

16. The method of claim 13, wherein the average width of the extrusion slots machined by the grinding wheel is less than the average diameter of the wire used during the wire electrical discharge machining process.

17. The method of claim 13, wherein the average width of the extrusion slots machined by the grinding wheel is greater than the average diameter of the wire used during the wire electrical discharge machining process.

18. The method of claim 17, wherein the wire used during the electrical discharge machining process is run along a first depth path to machine a first side of each extrusion slot and a second depth path to machine a second side of the corresponding extrusion slot.

19. The method of claim 18, wherein the first depth path is spaced from the second depth path.

20. The method of claim 13, wherein the wire electrical discharge machining process machines a divot in at least one of the extrusion slots of the honeycomb pattern of extrusion slots.

21. The method of claim 1, wherein each of the plurality of blades has a uniform radial thickness.

* * * * *